United States Patent
Qi et al.

(10) Patent No.: US 8,975,799 B2
(45) Date of Patent: Mar. 10, 2015

(54) BROAD-POLE TYPE SQUARE-WAVE THREE-PHASE BRUSHLESS PERMANENT MAGNET DIRECT CURRENT MOTOR AND ASSEMBLING METHOD THEREOF

(75) Inventors: Yamei Qi, Shenzhen (CN); Tiecai Li, Shenzhen (CN); Zhaoyong Zhou, Shenzhen (CN); Weilong Lan, Shenzhen (CN); Zhihui Liao, Shenzhen (CN); Shinian Li, Shenzhen (CN)

(73) Assignee: Shenzhen A&E Servo Motor Technology Co., Ltd., Shenzhen, Guangdong Province (CN)

( * ) Notice: Subject to any disclaimer, the term of this patent is extended or adjusted under 35 U.S.C. 154(b) by 589 days.

(21) Appl. No.: 13/805,341

(22) PCT Filed: Aug. 12, 2009

(86) PCT No.: PCT/CN2009/073213
§ 371 (c)(1),
(2), (4) Date: Dec. 18, 2012

(87) PCT Pub. No.: WO2011/017839
PCT Pub. Date: Feb. 17, 2011

(65) Prior Publication Data
US 2013/0106254 A1    May 2, 2013

(51) Int. Cl.
*H02K 3/00* (2006.01)
(52) U.S. Cl.
USPC .............. 310/179; 310/216.072; 310/216.073

(58) Field of Classification Search
USPC ............. 310/216.03, 216.074, 216.079, 310/216.086, 216.087, 179, 216.015, 310/216.051, 216.072, 216.073
See application file for complete search history.

(56) References Cited

U.S. PATENT DOCUMENTS 8,089,192 B2 * 1/2012 Li et al. ................ 310/216.009
2002/0175587 A1 * 11/2002 Vollmer ........................ 310/179

FOREIGN PATENT DOCUMENTS

| CN | 2389440 Y | 7/2000 |
| CN | 201118414 Y | 9/2008 |
| CN | 101371425 A | 2/2009 |
| JP | 6-261513 A | 9/1994 |
| JP | 8-256461 A | 10/1996 |
| JP | 11-234990 A | 8/1999 |

* cited by examiner

*Primary Examiner* — Hanh Nguyen
(74) *Attorney, Agent, or Firm* — Cheng-Ju Chiang

(57) ABSTRACT

A broad-pole type square-wave three-phase brushless permanent magnet direct current motor and an assembling method thereof are disclosed. The number of magnetic poles on a rotor core is: 2P=4. The number of slots in a stator core is: Z=6. Six teeth on the stator are composed of three large teeth and three small teeth. The sum of mechanical angels of one large tooth and one small tooth is 120 degree. Electrical angles corresponding to the mechanical angles are: P* 120=240°. Three-phase concentrated windings are wound on three large teeth separately, and only one winding is arranged at each phase. The advantages of the motor are low positioning torque, simple structure, effective production cost, convenient to wind the windings, and low copper loss, etc.

18 Claims, 4 Drawing Sheets

BROAD-POLE TYPE SQUARE-WAVE THREE-PHASE BRUSHLESS PERMANENT MAGNET DIRECT CURRENT MOTOR AND ASSEMBLING METHOD THEREOF

CROSS REFERENCE TO RELATED APPLICATIONS

The present application is a 35 U.S.C. §371 National Phase conversion of International (PCT) Patent Application No. PCT/CN2009/073213, filed on Aug. 12, 2009, the disclosure of which is incorporated by reference herein. The PCT International Patent Application was published in Chinese.

TECHNICAL FIELD

The present invention relates to a permanent magnet direct current motor, and more particularly to a broad-pole type square-wave three-phase brushless permanent magnet direct current motor and an assembling method thereof. The motor as provided is adapted for direct drive and position and rate servo control applications.

BACKGROUND TECHNOLOGY

According to drive current and back EMF waveform, a permanent magnet motor may be classified into a sine-wave permanent magnet motor and a square-wave permanent magnet motor. Generally, the sine-wave permanent magnet motor is referred to as a permanent magnet synchronous motor (PMSM) or a sine-wave AC servo motor, while the square-wave permanent magnet motor is referred to as a square-wave brushless DC motor (BLDCM).

The square-wave permanent magnet motor was widely used in 1980s. It has almost the same external characteristics as a brush DC motor and can be controlled in a simple mode. However, the biggest drawback of the square-wave permanent magnet motor is its relatively large switching torque fluctuation. Researchers have proposed many compensation measures, trying to overcome this drawback, but none of these measures has gained desired effects in applications.

Since the sine-wave permanent magnet motor has a much smaller moment fluctuation than the square-wave permanent magnet motor, it has gradually started to take the place of the square-wave permanent magnet motor since 1990s in accurate servo drive applications, and now become the mainstream of the current industrial applications. Nevertheless, accompanied by the use of the sine-wave permanent magnet motor is a much more complicated control system and a rapidly increased manufacture cost. What is more important, the force parameters of motor are significantly reduced.

On the other hand, the conventional square-wave brushless DC motors and the controlling technology thereof have been recognized as mature. Due to the aforesaid deficiency, it is restricted to applications that do not have high requirements. Little research has been conducted on the square-wave brushless DC motor ever since at home or abroad.

To solve the aforesaid technical problems, the inventor of the present invention filed earlier a patent application NO. CN101371425A for an invention titled "SQUARE-WAVE THREE-PHASE BRUSHLESS PERMANENT MAGNET DIRECT CURRENT MOTOR", which provides a motor having a number 2P=8 of poles. Objectively speaking, this motor still suffers from a great iron loss in high speed applications.

SUMMARY OF THE INVENTION

In view of the aforesaid defects existing with the conventional square-wave permanent magnet motors and sine-wave permanent magnet motors, the present invention proposes a broad-pole type square-wave permanent magnet motor which has a number 2P of poles, wherein 2P=4. The proposed motor is guided by a new principle and given a new structure, and has a high performance at low cost.

In particular, the present invention provides a broad-pole type square-wave three-phase brushless permanent magnet direct current motor, the motor comprising a rotor core provided with a plurality of pairs of permanent magnets thereon, and a stator slot provided with three phases of windings therein, wherein: the rotor core has a number 2P of magnetic poles, wherein 2P=4; the stator core has a number Z of slots wherein Z=6, and accordingly six teeth including three large teeth and three small teeth; the three phases of windings are concentrated windings which are respectively wound around the three large teeth, one phase including one winding only; and the windings and the teeth are arranged in the following order: a large tooth wound with phase-A winding→a small tooth→a large tooth wound with phase-B winding→a small tooth→a large tooth wound with phase-C winding→a small tooth, wherein A denotes phase-A concentrated winding; B denotes phase-B concentrated winding; and C denotes phase-C concentrated winding.

The motor's stator core comprises a large tooth core and three small tooth cores, the large tooth core having three large teeth and three insertion slots, each of which is arranged in a yoke between every two adjacent large teeth. The small tooth cores are inserted into respective insertion slots via an end part thereof.

In one embodiment, the large tooth core may be an integral large tooth core. Alternatively, the large tooth core may be consisting of three sectional large tooth cores, two adjacent sectional large tooth cores adjoining each other at a center line of the stator slot between two sectional large teeth cores.

According to the present invention, the large tooth core and each of the small tooth cores may consist of a plurality of layers of silicon steel sheets, these silicon steel sheets being riveted to form an integral structure via a positioning blind hole. In a preferred aspect, the large tooth core and each of the small tooth cores may consist of the same number of layers of silicon steel sheets. The insertion slot may be shaped like a dovetail.

According to the present invention, the slot between adjacent large and small teeth on the stator core preferably has an opening having a width ranging between 0.1 mm and 3 mm. Each large tooth occupies a mechanical angle ranging between 75° and 117° of the periphery, i.e., an electrical angle ranging between 150° and 234°, while each small tooth occupies a mechanical angle ranging between 3° and 45° of the periphery, i.e., an electrical angle ranging between 6° and 90°. Besides, the sum of mechanical angles of one large tooth and one small tooth is 120°, and the electrical angle is P×120°=240°.

According to the present invention, respective permanent magnets on the rotor core are arranged such that N magnetic pole and S magnetic pole alternate, and the permanent magnets are a tegular magnet steel that is magnetized radially or magnetized in parallel. A physical air gap having a width between 0.2 mm and 3 mm is formed between the stator and the rotor. The permanent magnets on the rotor core have a pole distance determined as (0.8~1)×πD/4, wherein D denotes an outer diameter of the rotor. The pole distance of the permanent magnet is (0.8~1) times of the electric motor pole distance "πD/4". With the times being decreased, the air-gap magnetic field of the electric motor is closer to a sine-wave change. When the times is decreased to (0.6~0.8), the air-gap magnetic field is the closest to a sine wave form.

In the present invention, a Hall position sensor is used to sense rotor position. The Hall position sensor is mounted on a stator holder, a magnetically sensitive direction of the Hall position sensor being identical to the normal line direction of the rotor, and an air gap between 1 mm and 3 mm being formed between the Hall position sensor and an outer circle of the permanent magnets on the rotor.

In another embodiment, the present invention provides a method for assembling the aforesaid broad-pole type square-wave three-phase brushless permanent magnet direct current motor, comprising: conducting an insulation treatment on the large teeth after the large tooth core is prepared; winding phase-A, -B and -C windings respectively around the three large teeth of the large tooth core using a winding machine; and inserting the three small tooth cores into the three insertion slots of the large tooth core respectively to form a stator core having three phases of windings.

If the large tooth core is consisting of three sectional large tooth cores, the assembling method comprises: conducting an insulation treatment on each of the sectional large tooth cores; winding phase-A, -B and -C windings respectively around the three sectional large tooth cores; and forming a stator core having three phases of windings.

As introduced supra, the number of magnetic poles of the broad-pole type square-wave three-phase brushless permanent magnet direct current motor is: 2P=4. These magnetic poles generate an air-gap magnetic field having a flat top area with an electrical angle larger than 120°. Due to non-uniformly distributed teeth and slots and magnetically balanced small teeth, the positioning torque as required is minimized. The motor provided in the present invention comprises only one concentrated winding at each phase, such that it has a simplified structure and a low manufacture cost. As the small teeth may be inserted later, it is not necessary to mount the small teeth in advance. As a result, it saves space to facilitate the winding. Even if the winding is done automatically using a machine, it makes sure of greater than 85% of the full usage of the slots. The motor produces a force that is 33% greater than that produced by the sine-wave permanent magnetic servo motors with conventionally distributed windings, while its winding has an end at least three times smaller than that of the sine-wave permanent magnetic servo motors with conventionally distributed windings, such that the motor of the present invention consumes much less copper. When driven by three-phase square-wave current, the square-wave three-phase brushless permanent magnet direct current motor may generate a stable and smooth moment having a fluctuation index equal to that of a sine-wave permanent magnetic servo motor.

BRIEF DESCRIPTION OF THE DRAWING

The present invention will be fully understood from the embodiments to set forth below with reference to the figures.

Figure 1:
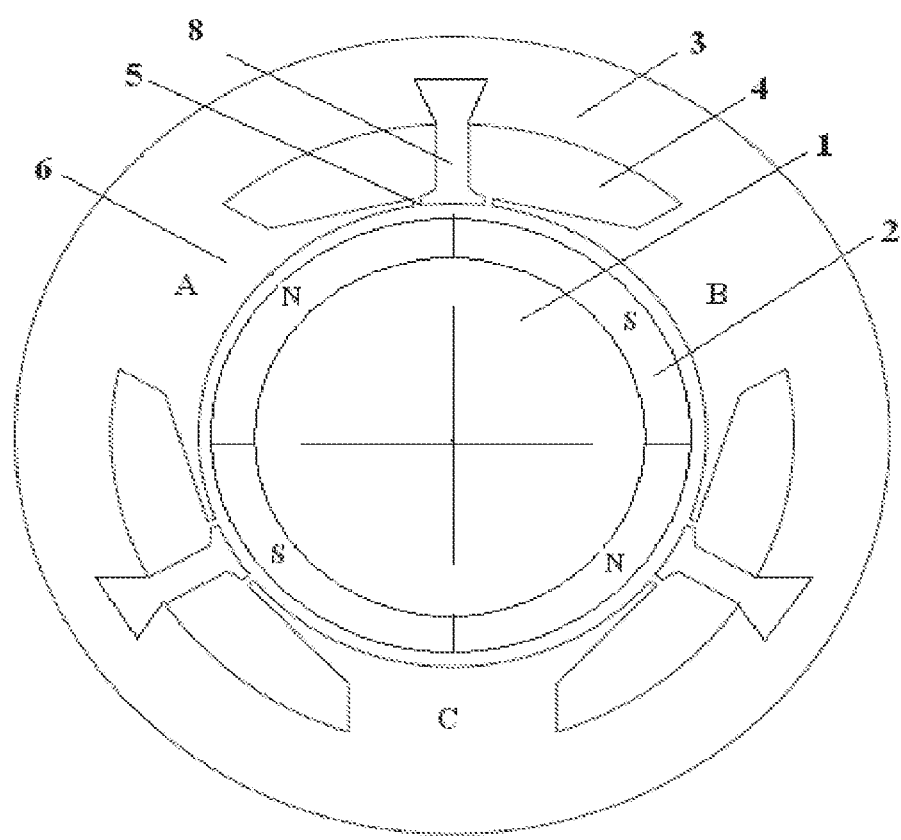
FIG. 1 is a schematic view showing a cross section of the stator and rotor of a motor according to a preferred embodiment of the present invention.

In the aforesaid figures, reference numeral "1" represents a rotor core; reference numeral "2" represents a permanent magnet; reference numeral "3" represents a yoke; reference numeral "4" represents a stator slot; reference numeral "5" represents a slot opening; reference numeral "6" represents a large tooth; reference numeral "7" represents a sectional large tooth core; reference numeral "8" represents a small tooth; reference numeral "9" represents an integral large tooth core; reference numeral "10" represents a small tooth silicon steel sheet; reference numeral "11" represents an insertion slot; reference numeral "12" represents a positioning blind hole; reference numeral "13" represents an end part of the small tooth silicon steel sheet; reference numeral "201" represents a rotary axis; reference numeral "202" represents a rotor; reference numeral "203" represents a stator; reference numeral "204" represents a physical air gap; and reference numeral "205" represents a stator holder.

DETAILED DESCRIPTION OF THE INVENTION

Figure 2:
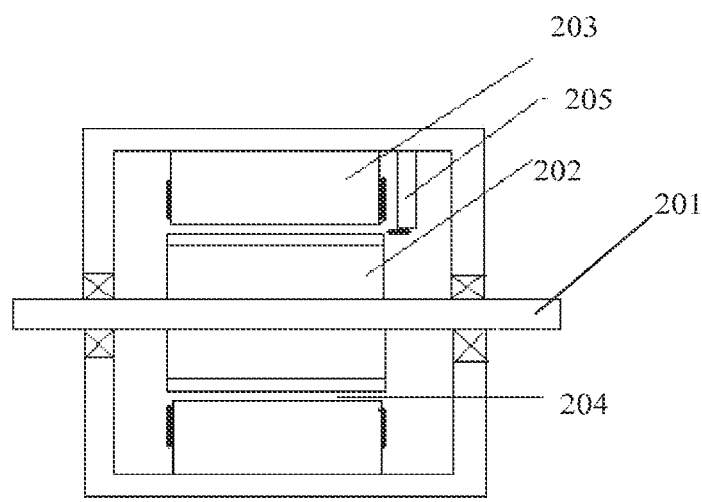
FIG. 2 is a schematic view of the overall structure of an assembled motor according to a preferred embodiment of the present invention.

One of the preferred embodiments of the present invention is show in FIG. 1 through FIG. 7. FIG. 2 illustrates an overall structure of the brushless permanent magnet direct current motor, which mainly comprises a rotary axis 201, a rotor 202, and a stator 203 etc., wherein a physical air gap 204 having a width between 0.2 mm and 3 mm is formed between the rotor 202 and the stator 203. A Hall position sensor is used to detect the rotor position. The Hall position sensor is established on the stator holder 205, the magnet-sensitive direction of the Hall position sensor being identical to the normal line direction of the rotor, and an air gap between 1 mm and 3 mm being formed between the Hall position sensor and the outer circle of the magnet steel of the rotor (i.e., the permanent magnets).

It can be seen from FIG. 1 that around the rotor core 1 is established two pairs of permanent magnets (totaling four permanent magnets), the two N poles and two S poles alternating. That is, the number of the magnetic poles of the rotor is: 2P=4. These permanent magnets generate an air-gap magnetic field. In particular implementations, the permanent magnets 2 may be a tegular magnet steel that is magnetized radially or magnetized in parallel. The pole distance of the permanent magnets on the rotor core is determined as $(0.8{\sim}1) \times \pi D/4$, wherein D denotes an outer diameter of the rotor.

The stator core is provided with a number Z of slots (Z=6) and accordingly six teeth. The stator slot 4 has a slot opening 5 having a width between 0.1 mm and 3 mm. Among the six teeth three are large while the other three are small, which are arranged circumferentially in an alternating order (i.e., a large tooth→a small tooth→a large tooth→a small tooth).

According to this embodiment, the three phases of windings are concentrated windings that are directly wound, using a winding machine (a stator winding machine), around the large teeth respectively, which teeth have been subjected to an insulation treatment. The windings and the teeth are arranged in the following order: the large tooth with phase-A winding→a small tooth→the large tooth with phase-B winding→a small tooth→the large tooth with phase-C winding→a small tooth, wherein A denotes phase-A concentrated winding; B denotes phase-B concentrated winding; and C denotes phase-C concentrated winding. As such, the motor comprises only three concentrated windings, which is a rather small number and significantly simplifies the motor structure and thus reduces the manufacture cost. Meanwhile, the end of the winding occupies a minimum area which is at least three times less than the corresponding area in a conventional motor, thereby tremendously reducing the consumption of copper.

Figure 3:
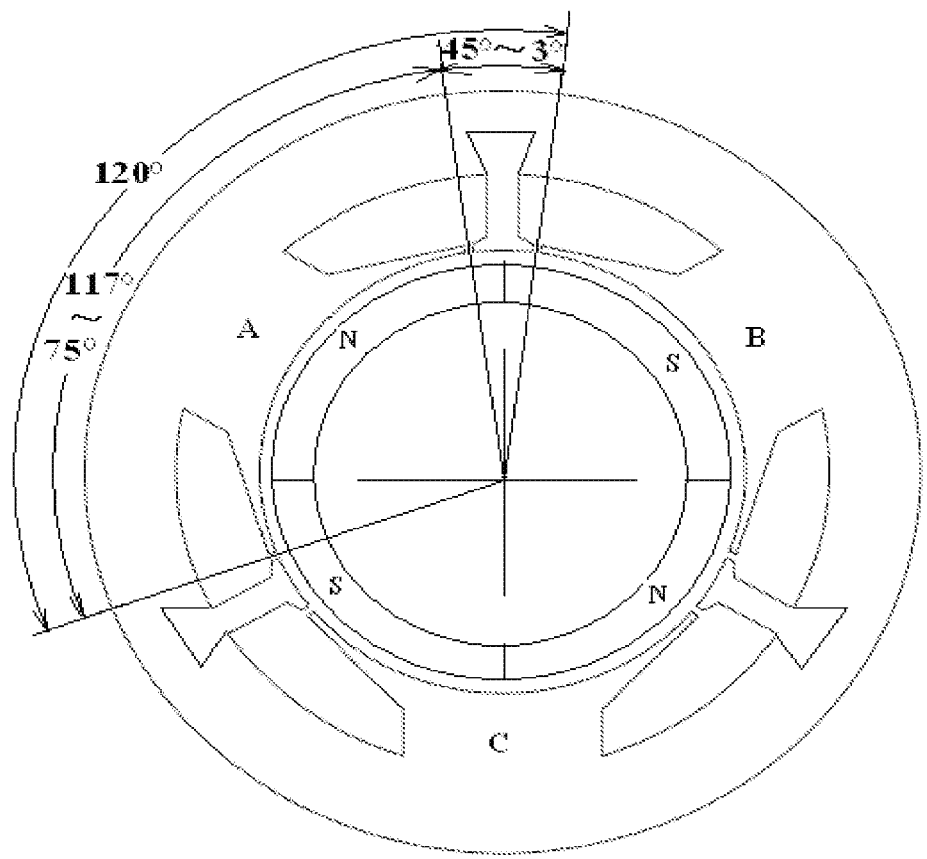
FIG. 3 illustrates distribution of angles between teeth and slots on the stator as shown in FIG. 1.

As shown in FIG. 3, each large tooth takes up a mechanical angle between 75° and 117° of the periphery (i.e., an electrical angle between 150° and 234°); each small tooth takes up a mechanical angle between 320 and 45° of the periphery (i.e., an electrical angle between 6° and 90° ). Beside, the sum of the mechanical angles of a large tooth and a small tooth equals to 120°, and the corresponding electrical angle equals to P×120°=240°. The mechanical angle of each tooth mentioned here includes the width of the slot opening.

Turning now to FIGS. 4 to 7, the stator core includes an integral large tooth core 9 and three small tooth cores 8, wherein the large tooth core 9 is provided with three large teeth 6, with one insertion slot 11 being arranged on each yoke between every two adjacent large teeth 6. There are three insertion slots in total. Each small tooth core 8 is inserted into one of the insertion slots 11 of the large tooth core 9 via its end part.

In particular implementations, the large tooth core 9 consists of a plurality of layers of large tooth silicon steel sheets, each layer being provided with a positioning blind hole 12 at the yoke and the teeth. Via these positioning blind holes 12, these layers of large tooth silicon steel sheets are riveted to form an integral structure. Likewise, each small tooth core 8 consists of a plurality of layers of small tooth silicon steel sheets, each layer 10 being provided with a positioning blind hole 12. Via these positioning blind holes, these layers of small tooth silicon steel sheets are riveted into an integral structure. In this embodiment, the large tooth core 9 and each of the small tooth cores 8 include the same number of silicon steel sheets.

Figure 4:
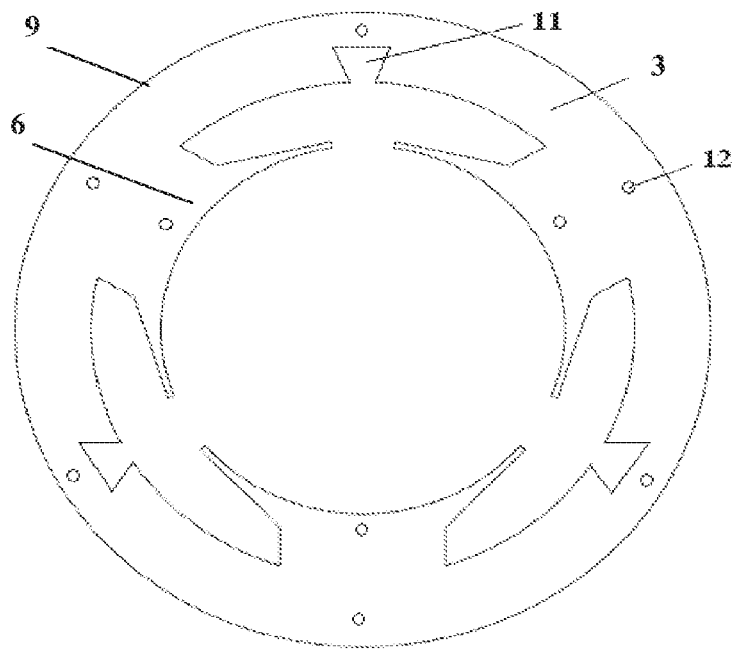
FIG. 4 is a schematic view showing one large tooth silicon steel sheet as shown in FIG. 1.
Figure 5:
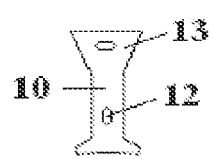
FIG. 5 is a schematic view showing one small tooth silicon steel sheet as shown in FIG. 1.
Figure 6:
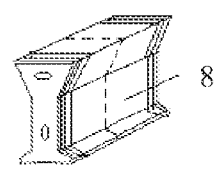
FIG. 6 is a schematic view showing a three-dimensional small tooth core consisting of a plurality of small tooth silicon steel sheets shown in FIG. 5.
Figure 7:
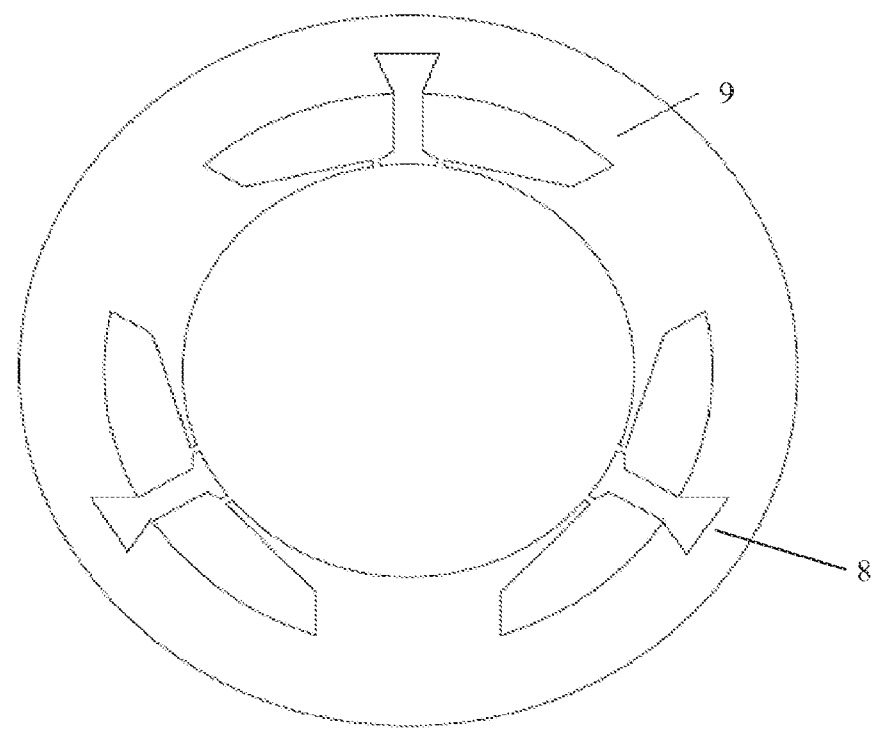
FIG. 7 is a schematic view of a stator core consisting of one large tooth core and three small tooth cores.

As is shown in FIGS. 4 and 7, the insertion slot 11 takes a dovetail structure with a large body but a small mouth. Accordingly, each of the small tooth silicon steel sheets 10 is designed with an end part 13 that is also shaped like a dovetail. The end part of the integral small tooth core can perfectly engage with the insertion slot 11.

During the assembly, after the large tooth core is made, the large teeth are first subjected to an insulation treatment. Then, around these three large teeth are wound three phases of windings (A, B and C) respectively using a winding machine. Thereafter, three small tooth cores 8 are respectively inserted into three insertion slots 11 of the large tooth core 9, thereby forming a stator core with three phases of windings.

Figure 8:
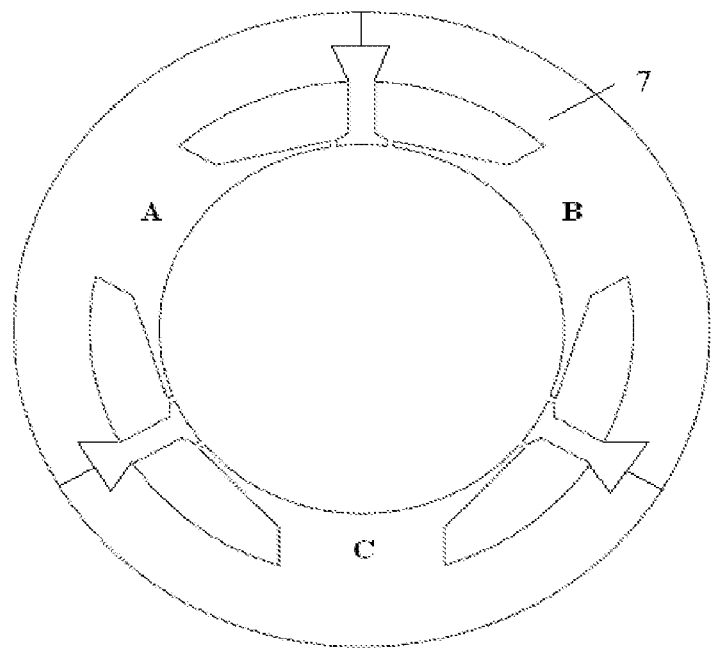
FIG. 8 is a schematic view of a stator core consisting of three large tooth cores and three small tooth cores.

To further facilitate the winding of the three phases of windings, in the embodiment as shown in FIG. 8, the integral large tooth core 9 having three teeth is divided into three sections based on the center line of the stator slot between two adjacent large teeth, forming three sectional large tooth cores 7. These three sectional large tooth cores 7 are subjected to an insulation treatment before windings of phases A, B and C are wound around them. Subsequently, these three sectional large tooth cores 7 and three small tooth cores are arranged in the following order: the sectional large tooth core with phase-A winding→a small tooth core→the sectional large tooth core with phase-B winding→a small tooth core→the sectional large tooth core with phase-C winding→a small tooth core, thereby forming a stator core with three phases of windings.

The aforesaid three sectional large tooth cores have completely the same structure in order to facilitate processing and production. Any three of the sectional large tooth core are assembled to form an integral tooth core by configuring a convex bump and a corresponding concave hole to form a snap-fit assembly, for example, the one illustrated in FIG. 6 of the Patent No. CN101371425A mentioned herein before.

From the embodiments described supra, it can be seen that the broad-pole type square-wave three-phase brushless permanent magnet direct current motor has a number 2P of magnetic poles (2P=4), which generate an air-gap magnetic field having a flat top area with an electrical angle more than 120°. Owing to the non-uniformly distributed teeth and slots and the magnetically balanced small teeth, the positioning torque as required is reduced to a minimum. Furthermore, the motor comprises only one concentrated winding at each phase, thereby enabling a simple structure and low manufacture cost.

It is of greater significance that as the small tooth cores may be inserted later, it is not necessary to mount the small tooth cores in advance. As a result, it saves space to facilitate the winding. Even if the winding is done automatically using a machine, it makes sure of greater than 85% of the full usage of the slots.

The motor produces a force that is 33% greater than that produced by the sine-wave permanent magnetic servo motors with conventionally distributed windings, while its winding has an end area at least three times smaller than that of the sine-wave permanent magnetic servo motors with conventionally distributed windings, such that the motor of the present invention consumes much less copper.

When driven by three-phase square-wave current, the broad-pole type square-wave three-phase brushless permanent magnet direct current motor may generate a stable and smooth moment having a fluctuation index equal to that of a sine-wave permanent magnetic servo motor. In particular, the motor as provided herein may be driven and controlled using the control system and method disclosed in the international application NO. PCT/CN2007/000178 directed to an invention titled "Control System and Method for Brushless Direct Current Motor".

What we claim is:

1. A broad-pole type square-wave three-phase brushless permanent magnet direct current motor, the motor comprising a rotor core provided with a plurality of pairs of permanent magnets thereon, and a stator slot provided with three phases of windings therein, wherein:

the rotor core has a number 2P of magnetic poles, wherein 2P=4;

the motor's stator core has a number Z of slots wherein Z=6, and accordingly six teeth including three large teeth and three small teeth;

the three phases of windings are concentrated windings which are respectively wound around the three large teeth, one phase including one winding only;

the windings and the teeth are arranged in the following order: the large tooth wound with phase-A winding →a small tooth →the large tooth wound with phase-B winding →a small tooth →the large tooth wound with phase-C winding →a small tooth, wherein A denotes phase-A concentrated winding; B denotes phase-B concentrated winding; and C denotes phase-C concentrated winding;

the stator core comprises a large tooth core and three small tooth cores, the large tooth core having three large teeth and three insertion slots, each of which is arranged in a yoke between every two adjacent large teeth; and the small tooth cores are inserted into respective insertion slots via an end part thereof.

2. The broad-pole type square-wave three-phase brushless permanent magnet direct current motor according to claim 1, wherein:
   the slot between adjacent large and small teeth on the stator core has an opening having a width ranging between 0.1 mm and 3 mm;
   each large tooth occupies a mechanical angle ranging between 75° and 117° of the periphery, i.e., an electrical angle ranging between 150° and 234°;
   each small tooth occupies a mechanical angle ranging between 3° and 45° of the periphery, i.e., an electrical angle ranging between 6° and 90°; and
   the sum of mechanical angles of one large tooth and one small tooth is 120°, and the electrical angle is P×120°=240°.

3. The broad-pole type square-wave three-phase brushless permanent magnet direct current motor according to claim 2, wherein:
   respective permanent magnets on the rotor core are arranged such that N magnetic pole and S magnetic pole alternate, and the permanent magnets are a tegular magnet steel that is magnetized radially or magnetized in parallel;
   a physical air gap having a width between 0.2 mm and 3 mm is formed between the motor's stator and rotor; and
   the permanent magnets on the rotor core have a pole distance determined as (0.8~1)×πD/4, D denoting an outer diameter of the rotor.

4. The broad-pole type square-wave three-phase brushless permanent magnet direct current motor according to claim 3, wherein:
   a Hall position sensor is used to sense rotor position; and
   the Hall position sensor is mounted on a stator holder, a magnetically sensitive direction of the Hall position sensor being identical to the normal line direction of the rotor, and an air gap between 1 mm and 3 mm being formed between the Hall position sensor and an outer circle of the permanent magnets on the rotor.

5. The broad-pole type square-wave three-phase brushless permanent magnet direct current motor according to claim 1, wherein:
   the large tooth core is an integral large tooth core; or
   the large tooth core is consisting of three sectional large tooth cores, two adjacent sectional large tooth cores adjoining each other at a center line of the stator slot between two sectional large teeth cores.

6. The broad-pole type square-wave three-phase brushless permanent magnet direct current motor according to claim 5, wherein:
   the integral large tooth core or the sectional large tooth cores consist of a plurality of layers of large tooth silicon steel sheets, the large tooth silicon steel sheets being riveted to form an integral structure via a positioning blind hole provided at the yoke and the teeth on each layer; and
   the small tooth cores each consist of a plurality of layers of small tooth silicon steel sheets, the small tooth silicon steel sheets being riveted to form an integral structure via a positioning blind hole provided on each layer.

7. The broad-pole type square-wave three-phase brushless permanent magnet direct current motor according to claim 6, wherein: the large tooth core and each of the small tooth cores comprise the same number of layers of the silicon steel sheets; and the insertion slot has a dovetail structure.

8. The broad-pole type square-wave three-phase brushless permanent magnet direct current motor according to claim 7, wherein:
   the slot between adjacent large and small teeth on the stator core has an opening having a width ranging between 0.1 mm and 3 mm;
   each large tooth occupies a mechanical angle ranging between 75° and 117° of the periphery, i.e., an electrical angle ranging between 150° and 234°;
   each small tooth occupies a mechanical angle ranging between and 3° and 45° of the periphery, i.e., an electrical angle ranging between and 6° and 90°; and
   the sum of mechanical angles of one large tooth and one small tooth is 120°, and the electrical angle is P×120°=240°.

9. The broad-pole type square-wave three-phase brushless permanent magnet direct current motor according to claim 8, wherein:
   respective permanent magnets on the rotor core are arranged such that N magnetic pole and S magnetic pole alternate, and the permanent magnets are a tegular magnet steel that is magnetized radially or magnetized in parallel;
   a physical air gap having a width between 0.2 mm and 3 mm is formed between the motor's stator and rotor; and
   the permanent magnets on the rotor core have a pole distance determined as (0.8~1)×πD/4, D denoting an outer diameter of the rotor.

10. The broad-pole type square-wave three-phase brushless permanent magnet direct current motor according to claim 9, wherein:
    a Hall position sensor is used to sense rotor position; and
    the Hall position sensor is mounted on a stator holder, a magnetically sensitive direction of the Hall position sensor being identical to the normal line direction of the rotor, and an air gap between 1 mm and 3 mm being formed between the Hall position sensor and an outer circle of the permanent magnets on the rotor.

11. The broad-pole type square-wave three-phase brushless permanent magnet direct current motor according to claim 6, wherein:
    the slot between adjacent large and small teeth on the stator core has an opening having a width ranging between 0.1 mm and 3 mm;
    each large tooth occupies a mechanical angle ranging between 75° and 117° of the periphery, i.e., an electrical angle ranging between 150° and 234°;
    each small tooth occupies a mechanical angle ranging between 3° and 45° of the periphery, i.e., an electrical angle ranging between 6° and 90°; and
    the sum of mechanical angles of one large tooth and one small tooth is 120°, and the electrical angle is P×120°=240°.

12. The broad-pole type square-wave three-phase brushless permanent magnet direct current motor according to claim 11, wherein:
    respective permanent magnets on the rotor core are arranged such that N magnetic pole and S magnetic pole alternate, and the permanent magnets are a tegular magnet steel that is magnetized radially or magnetized in parallel;
    a physical air gap having a width between 0.2 mm and 3 mm is formed between the motor's stator and rotor; and
    the permanent magnets on the rotor core have a pole distance determined as (0.8~1)×πD/4, D denoting an outer diameter of the rotor.

13. The broad-pole type square-wave three-phase brushless permanent magnet direct current motor according to claim 12, wherein:

a Hall position sensor is used to sense rotor position; and
the Hall position sensor is mounted on a stator holder, a magnetically sensitive direction of the Hall position sensor being identical to the normal line direction of the rotor, and an air gap between 1 mm and 3 mm being formed between the Hall position sensor and an outer circle of the permanent magnets on the rotor.

14. The broad-pole type square-wave three-phase brushless permanent magnet direct current motor according to claim 5, wherein:
the slot between adjacent large and small teeth on the stator core has an opening having a width ranging between 0.1 mm and 3 mm;
each large tooth occupies a mechanical angle ranging between 75° and 117° of the periphery, i.e., an electrical angle ranging between 150° and 234°;
each small tooth occupies a mechanical angle ranging between 3° and 45° of the periphery, i.e., an electrical angle ranging between 6° and 90°; and
the sum of mechanical angles of one large tooth and one small tooth is 120°, and the electrical angle is P×120°=240°.

15. The broad-pole type square-wave three-phase brushless permanent magnet direct current motor according to claim 14, wherein:
respective permanent magnets on the rotor core are arranged such that N magnetic pole and S magnetic pole alternate, and the permanent magnets are a tegular magnet steel that is magnetized radially or magnetized in parallel;
a physical air gap having a width between 0.2 mm and 3 mm is formed between the motor's stator and rotor; and
the permanent magnets on the rotor core have a pole distance determined as $(0.8\sim1)\times\pi D/4$, D denoting an outer diameter of the rotor.

16. The broad-pole type square-wave three-phase brushless permanent magnet direct current motor according to claim 15, wherein:
a Hall position sensor is used to sense rotor position; and
the Hall position sensor is mounted on a stator holder, a magnetically sensitive direction of the Hall position sensor being identical to the normal line direction of the rotor, and an air gap between 1 mm and 3 mm being formed between the Hall position sensor and an outer circle of the permanent magnets on the rotor.

17. A method for assembling the broad-pole type square-wave three-phase brushless permanent magnet direct current motor according to claim 1, comprising:
conducting an insulation treatment on the large teeth after the large tooth core is prepared;
winding phase-A, -B and -C windings respectively around the three large teeth of the large tooth core using a winding machine; and
inserting the three small tooth cores into the three insertion slots of the large tooth core respectively to form a stator core having three phases of windings.

18. The method according to claim 17, comprising:
if the large tooth core is consisting of three sectional large tooth cores, conducting an insulation treatment on each of the sectional large tooth cores;
winding phase-A, -B and -C windings respectively around the three sectional large tooth cores; and
arranging the three sectional large tooth cores and the three small tooth cores in the following order: the sectional large tooth core wound with phase-A winding →a small tooth core →the sectional large tooth core wound with phase-B winding →a small tooth core →the sectional large tooth core wound with phase-C winding →a small tooth core to form a stator core having three phases of windings.

* * * * *